(12) United States Patent
Mudiam et al.

(10) Patent No.: US 8,798,807 B2
(45) Date of Patent: Aug. 5, 2014

(54) DATA DISTRIBUTION SYSTEM AND METHOD FOR DISTRIBUTING DATA IN A VEHICLE

(75) Inventors: Veni Mudiam, Erie, PA (US); David Joseph Schroeck, Erie, PA (US); David Joseph DeSanzo, Erie, PA (US); Saravana Karthikeyan Urkavalan, Bangalore (IN); Matthew Paul Joseph, Erie, PA (US); Saket Agrawal, Bangalore (IN)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 13/311,267

(22) Filed: Dec. 5, 2011

(65) Prior Publication Data

US 2012/0316700 A1 Dec. 13, 2012

Related U.S. Application Data

(60) Provisional application No. 61/496,283, filed on Jun. 13, 2011.

(51) Int. Cl.
*G06F 7/00* (2006.01)

(52) U.S. Cl.
USPC .................. 701/1; 701/36; 702/183; 702/182

(58) Field of Classification Search
USPC .................................. 701/1, 35, 36, 182, 183
See application file for complete search history.

(56) References Cited

U.S. PATENT DOCUMENTS

| 5,956,250 | A | 9/1999 | Gudat et al. |
| 6,336,120 | B1 | 1/2002 | Noddings et al. |
| 6,928,344 | B2 | 8/2005 | McWalter et al. |
| 6,996,397 | B2 | 2/2006 | Fraser et al. |
| 7,219,067 | B1 | 5/2007 | McMullen et al. |
| 7,224,132 | B2 * | 5/2007 | Cho et al. ....................... 318/139 |
| 7,239,859 | B2 | 7/2007 | Madhavan et al. |
| 7,243,012 | B2 | 7/2007 | Miyake et al. |
| 7,269,482 | B1 | 9/2007 | Shultz et al. |

(Continued)

FOREIGN PATENT DOCUMENTS

| WO | 0060464 A1 | 10/2000 |
| WO | 2007117370 A1 | 10/2007 |

OTHER PUBLICATIONS

Search Report and Written Opinion from corresponding PCT Application No. PCT/US2012/041989 dated Nov. 2, 2012.

*Primary Examiner* — Mary Cheung
*Assistant Examiner* — Michael Berns
(74) *Attorney, Agent, or Firm* — GE Global Patent Operation; John A. Kramer

(57) ABSTRACT

A data distribution system for a vehicle includes a data distributor module that is communicatively coupled with a data acquisition module that obtains values of available data parameters related to operation of the vehicle, a service module that provides functions for the vehicle based on the values, and a memory. The data distributor module receives a request list from the service module that includes one or more requested data parameters of the available data parameters. The data acquisition module stores the values of the requested data parameters in the memory. The data distributor module retrieves the values of one or more of the requested data parameters from the memory and communicates the values that are retrieved to the service module for the service module to use the values that are retrieved to provide the functions for the vehicle.

21 Claims, 4 Drawing Sheets

(56) References Cited

U.S. PATENT DOCUMENTS

| | | |
|---|---|---|
| 7,395,131 B2 * | 7/2008 | Funk .................... 700/108 |
| 7,504,706 B2 | 3/2009 | Swaminathan et al. |
| 7,577,634 B2 | 8/2009 | Ryan et al. |
| 7,647,142 B2 | 1/2010 | Desanzo |
| 7,705,775 B2 | 4/2010 | Madhavan et al. |
| 7,782,814 B2 | 8/2010 | Fraser et al. |
| 7,904,219 B1 | 3/2011 | Lowrey et al. |
| 7,912,149 B2 | 3/2011 | Chesnutt et al. |
| 8,050,673 B2 | 11/2011 | Madhavan et al. |
| 8,054,924 B2 | 11/2011 | Madhavan |
| 2005/0131595 A1 * | 6/2005 | Luskin et al. ............. 701/29 |
| 2005/0163727 A1 | 7/2005 | Doyle et al. |
| 2005/0171661 A1 | 8/2005 | Abdel-Malek et al. |
| 2006/0193790 A1 | 8/2006 | Doyle et al. |
| 2007/0092024 A1 | 4/2007 | Madhavan et al. |
| 2007/0102811 A1 | 5/2007 | Swaminathan et al. |
| 2007/0120225 A1 | 5/2007 | Swaminathan et al. |
| 2007/0140987 A1 | 6/2007 | Doyle et al. |
| 2007/0190950 A1 | 8/2007 | Madhavan et al. |
| 2007/0258398 A1 | 11/2007 | Chesnutt et al. |
| 2008/0074276 A1 * | 3/2008 | Valencia et al. .......... 340/635 |
| 2008/0102854 A1 | 5/2008 | Yi et al. |
| 2008/0247484 A1 | 10/2008 | Chesnutt et al. |
| 2008/0255828 A1 | 10/2008 | Chesnutt et al. |
| 2009/0172102 A1 | 7/2009 | Chesnutt et al. |
| 2009/0234522 A1 | 9/2009 | Desanzo |
| 2009/0249074 A1 | 10/2009 | Madhavan et al. |
| 2009/0323967 A1 | 12/2009 | Peirce et al. |
| 2010/0131127 A1 | 5/2010 | DeSanzo |
| 2010/0167702 A1 | 7/2010 | Madhavan et al. |
| 2010/0167721 A1 | 7/2010 | Madhavan et al. |
| 2010/0167722 A1 | 7/2010 | Madhavan et al. |
| 2010/0167727 A1 | 7/2010 | Madhavan et al. |
| 2010/0167737 A1 | 7/2010 | Madhavan et al. |
| 2010/0167745 A1 | 7/2010 | Madhavan et al. |
| 2010/0185472 A1 | 7/2010 | Goodermuth et al. |
| 2010/0202616 A1 | 8/2010 | Peirce et al. |
| 2010/0241295 A1 | 9/2010 | Cooper et al. |
| 2010/0286853 A1 | 11/2010 | Goodermuth et al. |
| 2010/0321170 A1 | 12/2010 | Cooper et al. |
| 2011/0038307 A1 | 2/2011 | Madhavan et al. |
| 2011/0039527 A1 | 2/2011 | Yi et al. |
| 2011/0039528 A1 | 2/2011 | Yi et al. |
| 2011/0039533 A1 | 2/2011 | Yi et al. |
| 2011/0039538 A1 | 2/2011 | Madhavan et al. |
| 2011/0039556 A1 | 2/2011 | Yi et al. |
| 2011/0039587 A1 | 2/2011 | Madhavan et al. |
| 2011/0060486 A1 | 3/2011 | Meltser et al. |
| 2011/0068976 A1 | 3/2011 | Basnayake et al. |
| 2011/0093144 A1 | 4/2011 | Goodermuth et al. |
| 2011/0099413 A1 | 4/2011 | Cooper et al. |
| 2011/0144858 A1 | 6/2011 | Yun et al. |
| 2011/0144911 A1 | 6/2011 | Madhavan et al. |
| 2011/0217957 A1 | 9/2011 | Macdonald et al. |
| 2011/0249714 A1 | 10/2011 | Madhavan et al. |
| 2011/0282525 A1 | 11/2011 | Kraeling et al. |
| 2011/0284699 A1 | 11/2011 | Cooper et al. |
| 2011/0284700 A1 | 11/2011 | Brand et al. |
| 2011/0294466 A1 | 12/2011 | Tang et al. |

* cited by examiner

| DATA PARAMETER | SHARED MEMORY | MEMORY INDEX |
|---|---|---|
| A | 1 | 12345678 |
| E | 1 | 90123456 |

500

| DATA PARAMETER | SHARED MEMORY | MEMORY INDEX |
|---|---|---|
| C | 1 | 23456789 |
| G | 2 | 67890123 |
| L | 1 | 89012345 |

504

| DATA PARAMETER | SHARED MEMORY | MEMORY INDEX |
|---|---|---|
| B | 2 | 78901234 |
| F | 2 | 56789012 |
| J | 2 | 34567890 |
| L | 2 | 45678901 |

502

| DATA PARAMETER | SHARED MEMORY | MEMORY INDEX |
|---|---|---|
| D | 1 | 11223344 |
| H | 1 | 55667788 |

506

DATA DISTRIBUTION SYSTEM AND METHOD FOR DISTRIBUTING DATA IN A VEHICLE

CROSS-REFERENCE TO RELATED APPLICATIONS

This application claims the benefit of U.S. Provisional Application Ser. No. 61/496,283, filed Jun. 13, 2011, which is hereby incorporated by reference in its entirety.

BACKGROUND

Certain vehicles (e.g., powered vehicles or vehicle consists) include communication systems that periodically obtain measurements related to the health, operations, or control of the vehicle. For example, locomotives in a rail vehicle consist ("consist" referring to a group of vehicles linked to travel together along a route, including possible coordinated control over one or more wired and/or wireless connections) may include communication systems that periodically receive measurements related to operations of the locomotive, such as speed, horsepower, temperature, brake pressure measurements, and the like. These measurements represent data parameters of the vehicle, and the values of the data parameters may periodically change. For example, measurements of speed of a traction motor may be a first data parameter, measurements of brake pressures may be a second data parameter, and so on.

The data parameters may be measured or obtained by one or more sensors or components of the vehicle. The values of the data parameters are requested and used by computerized services or applications running on the vehicle and/or running off-board the vehicle. These services or applications perform various functions based on the data parameters. For example, the services or applications may control tractive operations and/or braking operations of the vehicle, monitor performance of the vehicle over time, record events of the vehicle, and the like.

Many data parameters may be obtained for a locomotive or other powered system. In some known systems, the data parameters are sent from the sensors or other components directly to the services or applications that use the data parameters. The same data parameters may be sent multiple times to different services or applications. The increased frequency at which the data parameters are sent increases the number of times that the data parameters are read and written (e.g., obtained from memory and saved to memory). The reading and writing of relatively large amounts of data parameters for relatively large numbers of services or applications can consume large portions of available computer processing and memory resources of the vehicle. As the amount of available processing and/or memory resources decreases, the latency involved in handling requests for data parameters and publishing the values of the data parameters back to the requesting services or applications can significantly increase and delay the functions provided by the services or applications.

BRIEF DESCRIPTION

In accordance with one embodiment, a data distribution system for a vehicle is provided. The distribution system includes a data distributor module. The data distributor module is configured to be communicatively coupled with a first data acquisition module that obtains values of one or more available data parameters related to operation of the vehicle, a first service module that provides one or more functions for the vehicle based on the values, and a memory. The data distributor module is further configured to receive a first request list from the first service module that includes one or more requested data parameters of the available data parameters. The data distributor module also is configured for the first data acquisition module to store the values of the requested data parameters in the memory. The data distributor module further is configured to retrieve the values of one or more of the requested data parameters from the memory and communicate the values that are retrieved to the first service module for the first service module to use the values that are retrieved to provide the one or more functions for the vehicle.

In another embodiment, a data distribution system for a vehicle is provided that includes a data distributor module and a shared memory. The data distributor module is communicatively coupled with the shared memory and is configured to receive requests for data parameters from a plurality of service modules, filter the requests for the data parameters, and communicate the filtered requests for the data parameters to a plurality of data acquisition modules that generate the data parameters and store the data parameters in the shared memory. The data parameters relate to operations of the vehicle. The data distributor module also is configured to at least one of: retrieve the data parameters from the shared memory, based on memory indices of the stored data parameters received from the data acquisition modules, and communicate the data parameters that are retrieved from the shared memory to the plurality of service modules for use by the plurality of service modules in performing one or more functions for the vehicle; or communicate the memory indices to the plurality of service modules for the service modules to retrieve the stored data parameters from the shared memory.

In another embodiment, a method for distributing data in a vehicle is provided. The method includes receiving a first request list for values of one or more requested data parameters. The values represent (i.e., relate to) operations of the vehicle and used to perform one or more functions for the vehicle. The method also includes determining which of one or more data acquisition modules acquires the values of the one or more requested data parameters and storing the values in a memory. The method further includes retrieving the values from the memory in order to transmit the values to one or more service modules that use the values to perform the functions for the vehicle.

In another embodiment, another method for distributing data in a vehicle is provided. The method includes receiving requests for data parameters from a plurality of service modules. The data parameters relate to operations of the vehicle. The method also includes filtering the requests for the data parameters and communicating the requests that are filtered for the data parameters to a plurality of data acquisition modules that generate the data parameters and store the data parameters in a shared memory with memory indices representative of where the data parameters are stored. The method also includes at least one of: retrieving the data parameters from the shared memory, based on memory indices of the data parameters that are stored in the shared memory and received from the data acquisition modules, and communicating the data parameters that are retrieved from the shared memory to the plurality of service modules for use by the plurality of service modules in performing one or more functions for the vehicle; or communicating the memory indices to the plurality of service modules for the service modules to retrieve the stored data parameters from the shared memory based on the memory indices.

In another embodiment, another data distribution system for a vehicle is provided. The distribution system includes a request list submodule, a filter submodule, a reader submodule, and a publication submodule. The request list submodule is configured to receive requests for values of one or more available data parameters from plural service modules of the vehicle. The data parameters represent operations of the vehicle. The filter submodule is configured to filter the requests based on which of plural data acquisition modules of the vehicle acquire the values of the data parameters in the requests. One or more of the data acquisition modules store the values in a shared memory. The reader submodule is configured to retrieve the values of the data parameters in the requests from the shared memory. The publication submodule is configured to form one or more messages for transmission to the service modules. The one or more messages include the values of the data parameters that are requested by the service modules.

DETAILED DESCRIPTION

Figure 1:
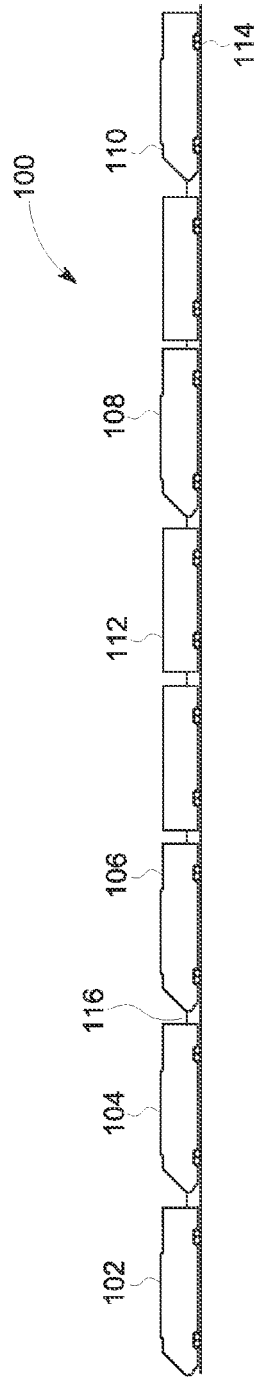
FIG. 1 is a schematic illustration of one embodiment of a vehicle consist.

The foregoing brief description, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 is a schematic illustration of one embodiment of a rail vehicle consist 100. In the illustrated embodiment, the consist 100 includes a lead powered unit 102 mechanically coupled with several trailing or remote powered units 104, 106, 108, 110 and non-powered units 112. The consist 100 travels along a track 114. The powered units 102, 104, 106, 108, 110 and/or non-powered units 112 may be referred to as rail vehicles of the consist 100. The lead powered unit 102 and the remote powered units 104, 106, 108, 110 supply tractive forces to propel the consist 100 along the track 114. For example, the powered units 102, 104, 106, 108, 110 may represent locomotives capable of self-propulsion. In one embodiment, the consist 100 includes the lead powered unit 102 as a leading locomotive disposed at the front end of the consist 100 and the remote powered units 104, 106, 108, 110 as trailing locomotives disposed behind the lead powered unit 102 between the lead powered unit 102 and the back end of the consist 100. Alternatively, the lead powered unit 102 may be disposed between one or more of the remote powered units 104, 106, 108, 110 and the back end of the consist 100.

The non-powered units 112 may be cars for carrying cargo (e.g., goods and/or passengers) along the track 114. The remote powered units 104, 106, 108, 110 are remote from the lead powered unit 102 in that the remote powered units 104, 106, 108, 110 are not located within (i.e., are not part of) the lead powered unit 102. A remote powered unit 104, 106, 108, 110 need not be separated from the lead powered unit 102 by a significant distance in order for the remote powered unit 104, 106, 108, 110 to be remote from the lead powered unit 102. For example, the remote powered unit 104 may be directly adjacent to and coupled with the lead powered unit 102 and still be remote from the lead powered unit 102. The number of powered units 102, 104, 106, 108, 110 in the consist 100 may vary from those shown in FIG. 1.

While one or more embodiments of the inventive subject matter disclosed herein are described in terms of rail vehicles, such as locomotives, the entire scope of the inventive subject matter is not limited to rail vehicles or locomotives. For example, one or more embodiments disclosed herein may be used in conjunction with other vehicles, such as Off Highway Vehicles (OHV) or other vehicles that propel goods and/or persons and that may not travel along a track or rails.

One or more conductive communication pathways 116 may extend along the consist 100 and between the powered units 102, 104, 106, 108, 110, 112. The communication pathway 116 can represent a wire or group of wires, such as a trainline, multiple unit (MU) cable, other conductive pathway (e.g., copper wire), fiber optic pathway, or the like, that extends through the consist 100 between the powered units 102, 104, 106, 108, 110 and the non-powered units 112. The communication pathway 116 may be used to communicate data between the powered units 102, 104, 106, 108, 110, 112.

Figure 2:
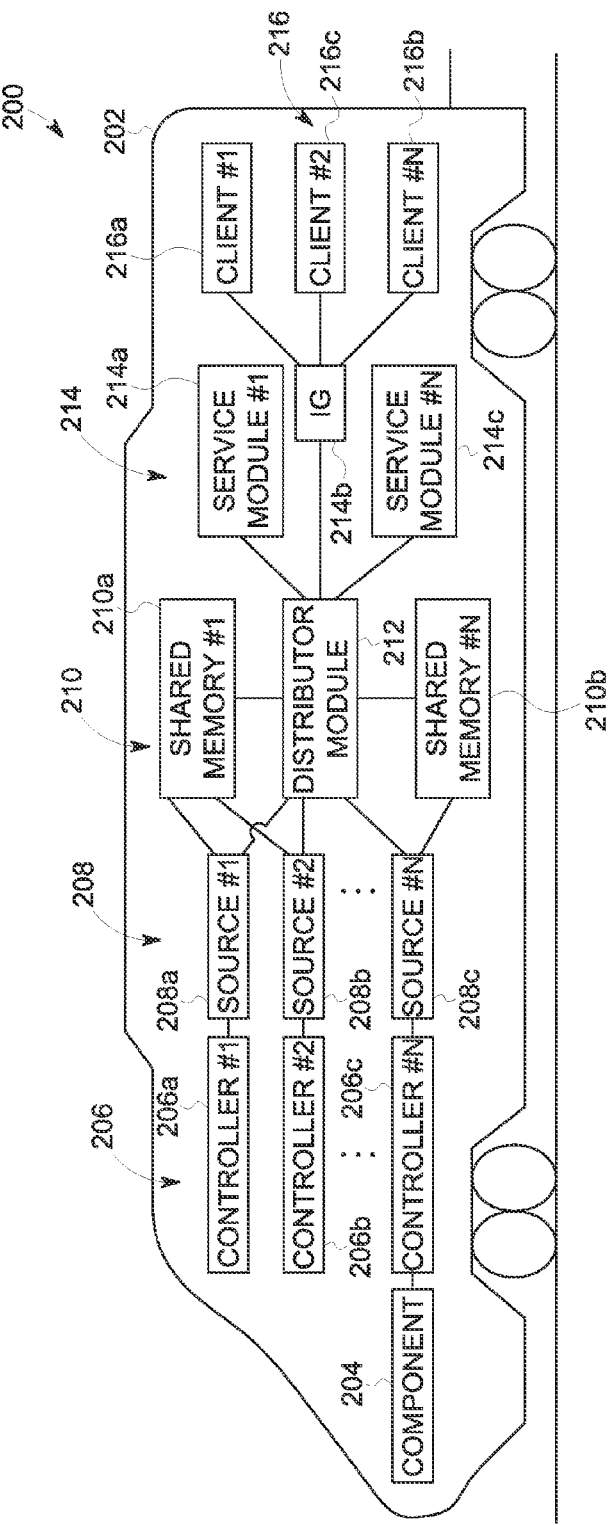
FIG. 2 is a schematic diagram of one embodiment of a vehicle data distribution system disposed on-board a vehicle.

FIG. 2 is a schematic diagram of one embodiment of a vehicle data distribution system 200 disposed on-board a vehicle 202. In the illustrated embodiment, the vehicle 202 is illustrated as a rail vehicle, such as a powered unit 102, 104, 106, 108, or 110 (shown in FIG. 1). Alternatively, the vehicle 202 may be another type of rail vehicle (such as a non-powered unit 112 shown in FIG. 1) or a non-rail vehicle, such as an OHV or other vehicle. The system 200 is shown in FIG. 2 as being disposed entirely on-board the vehicle 202. Alternatively, the system 200 may be spread out among several interconnected vehicles 202, such as by being partially disposed on each of several vehicles 202 that are mechanically coupled in a consist, similar to the consist 100 shown in FIG. 1.

The system 200 manages the acquisition and distribution of data related to operations of the vehicle 202. The vehicle 202 includes one or more components 204 that perform various operations of the vehicle 202. In one embodiment, the component 204 shown in FIG. 2 may represent a propulsion subsystem that generates tractive effort for the vehicle 202 to propel itself (e.g., a subsystem that includes one or more traction motors), a braking subsystem that generates braking effort for the vehicle 202 to slow down or stop itself from moving, an wireless communication system that is used to communicate with another vehicle or system outside of the vehicle 202 (e.g., a radio transceiver with antenna), a sensor that obtains data related to the vehicle 202 (e.g., a brake air pressure sensor, a fuel gauge, a cargo sensor, a global positioning system receiver, or the like), a device that receives input from an operator of the vehicle 202 to control the vehicle 202, and the like. The previous list provides a non-limiting example of the types of components 204 that may be used. In one embodiment, any device, sensor, system, subsystem, memory, module, assembly, processor, or the like may be used as the component 204. While only one component 204 is shown in FIG. 2, the vehicle 202 may include a plurality of the components 204. One or more of the components 204 of the system 200 may be disposed off-board the vehicle 202, such as by being disposed on-board another vehicle that is mechanically coupled or interconnected with the vehicle 202.

The components 204 are operably coupled with controller devices 206 (e.g., "Controller #1," "Controller #2," and "Controller #N"). As used herein, the term "operably coupled" includes two or more controllers, devices, sensors, systems, subsystems, assemblies, processors, memories, modules, or the like that are connected by one or more wired and/or wireless communication links, such as cables, busses, wireless networks, conductors (e.g., copper wires), fiber optic cables, and the like, such as to enable communication of data therebetween. The controller devices 206 are generally referred to by the reference number 206 and individually referred to by the reference numbers 206a, 206b, and 206c. While three controller devices 206 are shown, alternatively, a smaller or larger number of controller devices 206 may be provided.

The controller devices 206 interface with the components 204 to obtain one or more of available data parameters from the components 204. As used herein, the term "available data parameters" includes a set of one or more data parameters having values that may be measured or obtained from the components 204. While only the controller device 206c is shown as interfacing with the component 204, each of the controller devices 206a, 206b may interface with other components that are the same or similar to the component 204 and/or may interface with the component 204. Moreover, while the description herein focuses on the controller device 206c, the description may equally apply to one or more other controller devices 206.

The controller devices 206 may include one or more electronic devices that obtain one or more of the available data parameters from the components 204 and/or direct one or more operations of the components 204. In one embodiment, the controller devices 206 may include sensors that obtain one or more of the data parameters from the components 204, processors or other logic-based devices, along with associated circuitry, that monitor and/or control the components 204, and the like.

The data parameters obtained by the controller devices 206 represent data values related to operations of the vehicle 202. As used herein, the term "operations" can refer to performance of the vehicle 202 (e.g., related to actions and events performed in propelling goods and/or passengers), control of the vehicle 202 (e.g., throttle and/or brake settings), and/or health conditions of the vehicle 202 (e.g., a status of the vehicle 202 such as whether maintenance is required for the vehicle 202 or one or more components 204 are malfunctioning).

For example, if the component 204 includes a propulsion subsystem that includes one or more traction motors and/or a sensor operably coupled with the propulsion subsystem, the controller device 206c may obtain measurements of horsepower generated by the traction motors, measurements of wheel slippage of the wheels connected to the traction motors, temperatures measurements of bearings, wheels, and/or axles interconnected with the traction motors, and the like. If the component 204 includes a braking subsystem that includes air brakes and/or regenerative brakes, the controller device 206c may obtain measurements of air pressure in the air brakes and/or reservoirs connected to the air brakes, measurements of current obtained from the regenerative brakes, settings of the air brakes and/or regenerative brakes, and the like. If the component 204 includes an antenna that is used to communicate with another vehicle or system outside of the vehicle 202, then the controller device 204c can obtain data parameters representative of which communication channels are being used, quality of service (QoS) measurements of communication over the antenna, and the like. If the component 204 includes a sensor, then the controller device 204c can obtain data parameters representative of quantities measured or sensed by the sensor. The above provides a non-exclusive set of data parameters that can be obtained by the controller devices 204. One or more other types of data parameters that relate to operations of the vehicle 202 may be obtained.

The controller devices 206 are operably coupled with data acquisition modules 208 (e.g., "Source #1," "Source #2," and "Source #N"). As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.

The data acquisition modules 208 are generally referred to by the reference number 208 and individually referred to by the reference numbers 208a, 208b, and 208c. While three data acquisition modules 208 are shown, alternatively, a smaller or larger number of data acquisition modules 208 may be provided. The data acquisition modules 208 interface with the controller devices 206 to acquire the data parameters obtained by the controller devices 206 from the components 204. While each of the data acquisition modules 208 is shown as only interfacing or communicating with a single controller device 206, alternatively, one or more of the data acquisition modules 208 may interface with a plurality of the controller devices 206, or plural of the data acquisition modules may interface with the same, single controller device.

In the distribution system 200, the data acquisition modules 208 may be referred to as "sources" of the available data parameters, since the data acquisition modules 208 acquire the data parameters from the controller devices 206 and produce the data parameters for consumption (e.g., use) by one or more other parts of the system 200, such as service modules 214 described below.

The data acquisition modules 208 are operably coupled with shared memories 210 ("Shared Memory #1" and "Shared Memory #2"). The shared memories 210 are generally referred to by the reference number 210 and individually referred to by the reference numbers 210a and 210b. While two shared memories 210 are shown, alternatively, a smaller or larger number of shared memories 210 may be provided. The data acquisition modules 208 interface with the shared memories 210 to transmit the data parameters to the shared memories 210. The shared memories 210 store the data parameters. A single data acquisition module 208 may interface with a single shared memory 210, plural data acquisition modules 208 may interface with a single shared memory 210, and/or a single data acquisition module 208 may interface with plural shared memories 210.

The shared memories 210 may include a tangible and non-transitory computer readable storage medium, such as a physical device that stores the data parameters on a temporary or permanent basis for use by another device, such as the service modules 214 described below. The shared memories 210 may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. In one embodiment, the shared memories are a single memory unit or device, such as a single hard disc, a single solid state drive, or a RAM/ROM unit of a controller. In another embodiment, all the data acquisition modules interface with a single memory unit or device, such as a single hard disc, a single solid state drive, or a RAM/ROM unit of a controller.

The data acquisition modules 208 and the shared memories 210 are operably coupled with a data distributor module 212 ("Distributor Module") in the illustrated embodiment. The data distributor module 212 manages and controls the distribution of the system 200 in a modular manner in one embodiment, as described below. For example, the data distributor module 212 may receive lists of data parameters requested by different service modules 214 (e.g., "requested data parameters"). The data distributor module 212 may determine which data acquisition modules 208 acquire the requested data parameters and notify the data acquisition modules 208 as to which data parameters are being requested. The data distributor module 212 can direct one or more of the data acquisition modules 208 to store the values of the requested data parameters in one or more of the shared memories 210. The data acquisition modules 208 store the values of the data parameters in the shared memories 210 and notify the data distributor module 212 where the values are stored in the shared memories 210. In one embodiment, for each of the service modules 214, the data distributor module 212 retrieves the values of the requested data parameters from the shared memories 210 for each service module 214 and communicates the values in a message for the corresponding service module 214.

The service modules 214 ("Service Module #1," "IG," and "Service Module #N") are operably coupled with the data distributor module 212. The service modules 214 are generally referred to by the reference number 214 and individually referred to by the reference numbers 214a, 214b, 214c. While three service modules 214 are shown, alternatively, a smaller or larger number of service modules 214 may be provided.

The service modules 214 perform functions based on, or by using, at least some of the data parameters. For example, the service modules 214 interface with the data distributor module 212 to receive the published data parameters from the data distributor module 212 in one embodiment. Alternatively, the service modules 214 may interface directly with the shared memories 210 to obtain the indexed data parameters.

The service modules 214 may be referred to as consumers of the data parameters as the service modules 214 receive and use the data parameters to perform one or more functions. A wide variety of functions related to operations of the vehicle 202 may be performed by the service modules 214. By way of example, a service module 214 may provide a digital video recorder (e.g., a locomotive digital video recorder or LDVR provided by General Electric Company) that obtains video recordings based on the data parameters (e.g., the data parameters may indicate when and/or where to record video). As another example, a service module 214 may provide asset tracking services (e.g., asset tracking system or ATS provided by General Electric Company) that monitors locations of assets (e.g., non-powered units and/or cargo such as goods and/or passengers) being propelled or conveyed by the vehicle 202 based on the data parameters.

A service module 214 may provide control services that control operations of the vehicle 202 and/or one or more other vehicles coupled or interconnected with the vehicle 202. For example, a service module 214 may use the data parameters to control the tractive efforts (e.g., by controlling throttle settings) provided by a propulsion subsystem of the vehicle 202 and/or to control braking efforts (e.g., by controlling brake settings) provided by brakes of the vehicle 202. The service module 214 may be part of a positive train control (PTC) system or a distributed power (DP) system that controls the tractive efforts and/or braking efforts of the vehicle 202 and/or one or more other powered units and/or non-powered units of a consist 100 (shown in FIG. 1) based on the data parameters. Alternatively, one or more of the service modules 214 may provide an energy management application that controls tractive effort and/or braking effort of the vehicle 202 (and/or one or more other powered units or vehicles of a consist 100) based on the data parameters. For example, a service module 214 may control throttle settings and/or brake settings based on a variety of factors represented by the data parameters, such as the types (e.g., horsepower provided) of powered units in a consist 100, the weight of cargo carried by the consist 100, the grade and/or curvature of the track 114 shown in FIG. 1, a geographic location obtained by a GPS receiver, and the like, in order to reduce fuel consumption by the consist 100. One example of such an energy management application may be Trip Optimizer™ provided by General Electric Company.

Other examples of a function provided by the service modules 214 can include control of cab signaling of a rail vehicle, an event recorder that monitors and records events related to operation of the vehicle 202, a location recorder that determines a geographic location of the vehicle 202 based on GPS sensor data received by a GPS receiver as a data parameter, fuel monitoring, radio monitoring, a visual display of operations or conditions of one or more components 204 of the vehicle 202, and the like. The above examples are provided for illustration and are not intended to be limiting on all embodiments of the presently described subject matter.

In the illustrated embodiment, the service module 214b includes or represents an information gateway ("IG"). An information gateway includes a module or component that provides a communication interface between the distribution system 200 and one or more client modules 216 ("Client #1," "Client #2," and "Client #N"). In one embodiment, the information gateway of the service module 214b may be referred to as a locomotive information gateway, or LIG. The client modules 216 are generally referred to by the reference number 216 and individually referred to by the reference numbers 216a, 216b, 216c. While three client modules 216 are shown, alternatively, a smaller or larger number of client modules 216 may be provided.

The client modules 216 may provide additional or redundant functions that are provided by the service modules 214. In one embodiment, the client modules 216 can include service modules that are similar to the service modules 214 but are provided or installed on the vehicle 202 by a third party, while the service modules 214 are provided or installed on the vehicle 202 by a manufacturer or installer of one or more of the data acquisition modules 208, the data distributor module 212, the controller devices 206, and/or the components 204 on the rail vehicle 202. The term "third party" can include non-original equipment manufacturers (OEMs) of the vehicle 202 and/or the distribution system 200. Alternatively, a third party may be determined based on the format in which the client modules 216 handle the data parameters. For example, a third party client module 216 may use a first propriety protocol or closed protocol (e.g., not open or compatible with other proprietary protocols without conversion of the data) while the manufacturer or installer of the data acquisition modules 208 and/or the data distributor module 212 uses a different, second proprietary protocol or an open protocol to communicate and/or store the data parameters. The service module 214b may convert the protocol of the data parameters between the different protocols. The service module 214b may act as an interface gateway between third party service modules and the system 200 such that data parameters and the system 200 remain secure from the third party service modules yet are able to communicate data parameters therebetween.

Figures 3, 4:
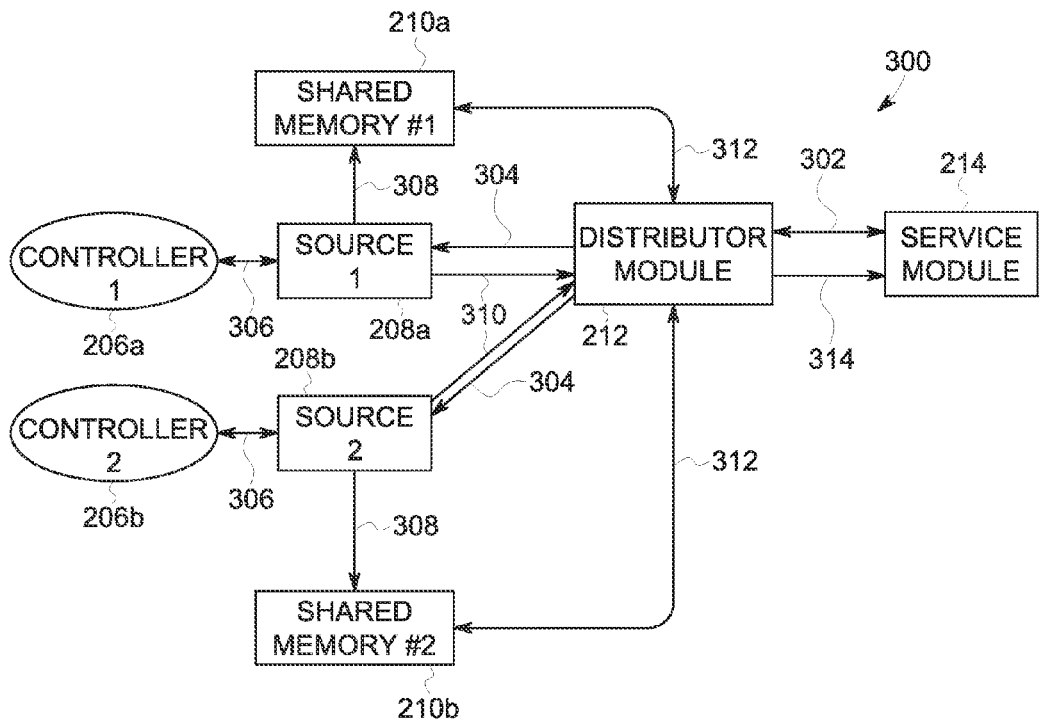
FIG. 3 is a diagram showing data or information flow through the system shown in FIG. 2 in accordance with one embodiment.
FIG. 4 illustrates several request lists of requested data parameters and associated data acquisition modules in accordance with one example.

FIG. 3 is a diagram showing data or information flow 300 through the system 200 shown in FIG. 2 in accordance with one embodiment. Some of the components, modules, devices, and other parts of the system 200 shown in FIG. 2 are not shown in FIG. 3, but the description of the flow 300 of data and data parameters in the system 200 that accompanies FIG. 3 may equally apply to the non-illustrated components, modules, devices, and other parts.

In operation, one or more of the service modules 214 determines which data parameters are needed for the service modules 214 to perform the functions provided by the service modules 214. For example, an energy management application may need data parameters that provide the types of locomotives in a train, the throttle settings, the grade of the track, and the like. The service modules 214 form request lists that include identifiers related to the needed data parameters. For example, the service module 214 may form a request list that includes one or more identities (e.g., unique identification numbers) associated with the data parameters being requested by the service modules 214. The identities may be referred to herein as "data parameter identifiers." The service modules 214 transmit 302 the request lists having the requested data parameters to the data distributor module 212 through one or more wired and/or wireless connections. The term "requested data parameters" can mean the identifying information, such as the unique identification numbers, associated with the data parameters requested by the service modules 214, rather than the values of the requested data parameters.

The data distributor module 212 receives the request lists from one or more of the service modules 214 and examines the request lists to determine which data parameters are requested by the service modules 214. For example, the data distributor module 212 may include a tangible and non-transitory computer readable storage medium, such as or similar to the shared memories 210, that has a look-up table, list, or other memory structure stored thereon. The table, list, or other memory structure may provide associations between the identities of the requested data parameters and the data acquisition modules 208 that acquire the corresponding data parameters. Table 1 below provides one example of such a table, list, or other memory structure:

TABLE 1

| Data Parameter Identifier | Data Acquisition Module |
|---|---|
| 13571113 | 1 |
| 24689101 | 2 |
| 11235813 | 3 |

As shown in Table 1, the first column includes several data parameter identifiers and the second column includes numbers representative of different data acquisition modules 208. The rows indicate which data parameter identifiers are associated with which data acquisition modules 208. For example, the data parameter identifier "13571113" is associated with a first data acquisition module 208 (e.g., "data acquisition module #1"), the data parameter identifier "24689101" is associated with a different, second data acquisition module 208 (e.g., "data acquisition module #2"), the data parameter identifier "11235813" is associated with a different, third data acquisition module 208 (e.g., "data acquisition module #3"), and so on. Additional data parameter identifiers and/or data acquisition modules 208 may be listed.

The association between the data parameter identifiers and the data acquisition modules 208 indicates which data acquisition modules 208 obtain values of the data parameters. For example, the first data acquisition module 208 obtains values for the data parameter indicated by the data parameter identifier "13571113," the second data acquisition module 208 obtains values for the data parameter indicated by the data parameter identifier "24689101," the third data acquisition module 208 obtains values for the data parameter indicated by the data parameter identifier "11235813," and so on. In one embodiment, a plurality of data parameter identifiers is associated with obtained by a single data acquisition module 208. For example, a single data acquisition module 208 may obtain values for two or more data parameters. A single data parameter identifier may be associated with a plurality of the data acquisition modules 208. For example, two or more data acquisition modules 208 may obtain values for the same data parameter.

The data distributor module 212 determines which data acquisition modules 208 obtain the values of the requested data parameters included in the request list received for one or a plurality of the service modules 214 based on the table, list, or other memory structure. In one embodiment, the data distributor module 212 filters the requests lists received from the service modules 214 by determining one or more sets of requested data parameters obtained by the same data acquisition module 208 across a plurality of the request lists. For example, the data distributor module 212 may examine the request lists from several service modules and group or filter the requested data parameters that are obtained by the same or a common data acquisition module 208 into a set. The data distributor module 212 can repeat this grouping or filtering for each of the data acquisition modules 208 that obtain one or more of the requested data parameters.

FIG. 4 illustrates several request lists 400, 402, 404, 406 of requested data parameters and associated data acquisition modules 208 (shown in FIG. 2) in accordance with one example. Each request list 400, 402, 404, 406 represents the list of data parameters requested by a different service module 214 (shown in FIG. 2). The left column in each request list 400, 402, 404, 406 includes the requested data parameter and the right column includes the associated data acquisition module 208 that obtains the values of the requested data parameter. The letters and numbers in the request lists 400, 402, 404, 406 are provided merely as examples. Alternatively, the left column of the request lists 400, 402, 404, 406 may include the data parameter identifiers.

The data distributor module 212 (shown in FIG. 2) can examine the requests lists 400, 402, 404, 406 of several service modules 214 (shown in FIG. 2) to determine which of the data acquisition modules 208 (shown in FIG. 2) obtain values of data parameters included in one or more of the request lists 400, 402, 404, 406. The data distributor module 212 can group the requested data parameters among several or all of the request lists 400, 402, 404, 406 according to which data acquisition modules 208 obtain the requested data parameters.

For example, with respect to a first data acquisition module 208 ("Data Acquisition Module #1" in FIG. 4), each of the request lists 400, 402, 404 include the requested data parameters "A" or "E" from the first data acquisition module 208. With respect to a second data acquisition module 208 ("Data Acquisition Module #2" in FIG. 4), each of the request lists 400, 402, 404, 406 include the requested data parameters "B," "F," "J," or "L" from the second data acquisition module 208. With respect to a third data acquisition module 208 ("Data Acquisition Module #3" in FIG. 4), each of the request lists 400, 402, and 406 include the requested data parameter "C," "G," or "L" from the third data acquisition module 208. With respect to a fourth data acquisition module 208 ("Data Acquisition Module #4" in FIG. 4), each of the request lists 400 and 404 include the requested data parameter "D" or "H" from the fourth data acquisition module 208.

Based on the commonly-requested data parameters among the request lists 400, 402, 404, 406, the data distributor module 212 forms one or more filtered lists for one or more of the data acquisition modules 208. In one embodiment, the filtered list for each of the data acquisition modules 208 indicates the requested data parameters that are obtained by the same data acquisition module 208 by one or more of the service modules 214, as indicated by the request lists 400, 402, 404, 406. Each of the filtered lists may include the data parameters requested from a common data acquisition module from one or more different service modules. With respect to the above example, the data distributor module 212 may form a first filtered list for the first data acquisition module 208 that includes the following requested data parameters: A (from the request lists 400, 404 associated with first and third service modules 214) and E (from the request list 402 associated with a second service module 214). The data distributor module 212 may form a second filtered list for the second data acquisition module 208 that includes the following requested data parameters: B (from the request lists 400, 402, and 404), F (from the request list 402), and J and K (from the request list 406 associated with a fourth service module 214). The data distributor module 212 may form a third filtered list for the third data acquisition module 208 that includes the following requested data parameters: C (from the request lists 400 and 402), G (from the request list 402), and L (from the request list 406). The data distributor module 212 may form a fourth filtered list for the fourth data acquisition module 208 that includes the following requested data parameters: D (from the request list 400) and H (from the request list 404).

Returning to the discussion of the flow 300 of information shown in FIG. 3, the data distributor module 212 sends 304 the filtered lists to the corresponding data acquisition modules 208. For example, the first filtered list described above may be sent to the first data acquisition module 208a and the second filtered list may be sent to the second data acquisition module 208b. Other filtered lists may be sent to other data acquisition modules 208. In one embodiment, the data acquisition modules 208 receive filtered lists that include only the data parameters that are obtained by the receiving data acquisition module 208. For example, the first filtered list may include only the data parameters that are acquired by the first data acquisition module 208a and the second filtered list may include only the data parameters that are acquired by the second data acquisition module 208b, regardless of which service module 214 requested the data parameters.

The data acquisition modules 208 obtain 306 values of the requested data parameters included in the received filtered list from the controller devices 206. For example, the first data acquisition module 208a may request or acquire values of the data parameters listed in the first filtered list received from the data distributor module 212 and the second data acquisition module 208b may request or acquire values of the data parameters listed in the second filtered list received from the data distributor module 212.

In one embodiment, the data acquisition modules 208 may periodically obtain updated or current values of the data parameters based on a predetermined rate. The predetermined rate may be a rate that is dictated by the controller device 206a or 206b, or by the data acquisition module 208a or 208b. Alternatively, the service modules 214 may include a requested acquisition rate along with the requested data parameters in the request lists 400, 402, 404, 406 (shown in FIG. 4). The data distributor module 212 may convey the requested acquisition rate to the corresponding data acquisition modules 208 and the data acquisition modules 208 may obtain the data parameters at the requested acquisition rate. In another embodiment, a data acquisition module 208 may compare a requested acquisition rate to a predetermined acquisition rate of the data acquisition module 208 and reject the requested acquisition rate and use the predetermined acquisition rate if the requested acquisition rate conflicts with (e.g., has a greater frequency than the) predetermined acquisition rate.

The data acquisition modules 208 save 308 (e.g., record) the values of the data parameters on one or more of the shared memories 210. In one embodiment, the data acquisition modules 208 create a memory index that specifies locations in the shared memories 210 where the values of the different data parameters are saved (e.g., recorded). For example, the data acquisition modules 208 may generate memory indices that provide addresses on the shared memories 210 where the various data parameters are stored and may be retrieved from the shared memories 210. In one embodiment, one or more of the data acquisition modules 208 may be assigned a unique portion of one or more of the shared memories 210. The data acquisition modules 208 may save the data parameters acquired by the data acquisition modules 208 in locations within the assigned portions of the shared memories 210. The memory indices generated by the data acquisition modules 208 indicate where in the different assigned portions of the shared memories 210 from which the data parameters may be obtained.

The data acquisition modules 208 create response lists that associate the data parameters with the memory indices of the shared memories 210 where the values of the data parameters are stored. For example, the data acquisition modules 208 may create tables that associated the different data parameters with different memory indices.

Figures 5, 6:
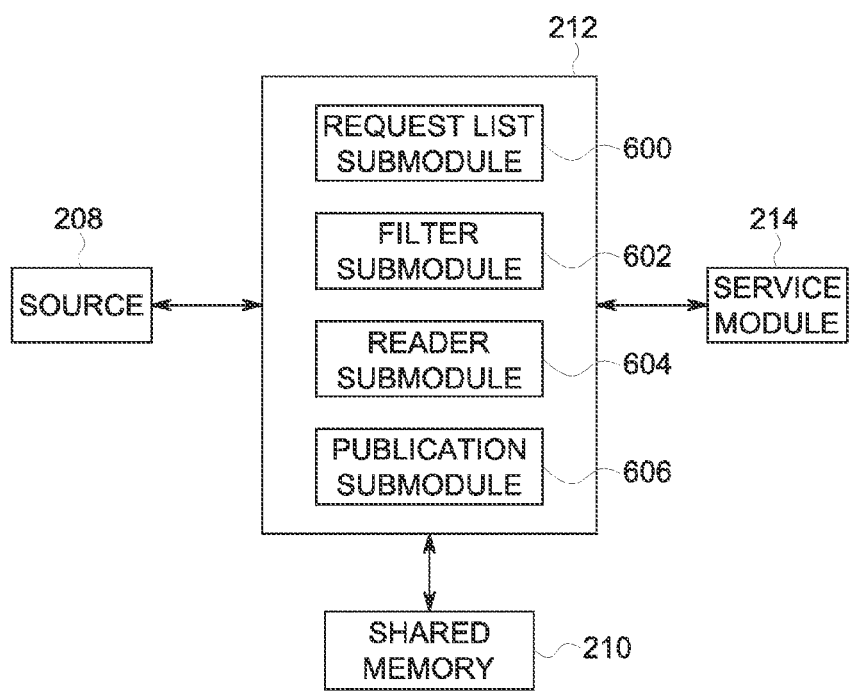
FIG. 5 illustrates several response lists generated by the data acquisition modules shown in FIG. 2 in accordance with one example.
FIG. 6 illustrates a schematic diagram of a data distribution module shown in FIG. 2.

FIG. 5 illustrates several response lists 500, 502, 504, 506 generated by the data acquisition modules 208 (shown in FIG. 2) in accordance with one example. Each response list 500, 502, 504, 506 represents the list of data parameters acquired by the associated data acquisition module 208, indications of the shared memory 210 (shown in FIG. 2) where the values of the data parameters are stored, and the memory index of where the values are stored in the corresponding shared memory 210. The left column in each response list 500, 502, 504, 506 includes the data parameter, the middle column includes the shared memory 210 where the value of the data parameter is stored, and the right column includes the memory index of the shared memory 210 where the value of the data parameter is stored. In one embodiment, the response lists 500, 502, 504, 506 do not include values of the data parameters.

Returning to the discussion of the flow 300 of information shown in FIG. 3, the data acquisition modules 208 transmit 310 the response lists 500, 502, 504, 506 (shown in FIG. 5) to the data distributor module 212. The data distributor module 212 uses the information in the received response lists 500, 502, 504, 506 to determine where to obtain the values of the data parameters requested by the service modules 214. For example, by referring to the response lists 500, 502, 504, 506, the data distributor module 212 can retrieve the values of the data parameters requested by the service modules 214 and listed in the request lists 400, 402, 404, 406 (shown in FIG. 4) from the service modules 214.

The data distributor module 212 uses the response lists 500, 502, 504, 506 from the data acquisition modules 208 and the request lists 400, 402, 404, 406 from the service modules 214 to determine where to retrieve the values of the requested data parameters and to determine where to send the retrieved values of the requested data parameters. Based on the memory indices associated with the requested data parameters, the data distributor module 212 retrieves 312 the values of the data parameters from the shared memories 210. The data distributor module 212 can retrieve the values by reading the values stored at the memory indices associated with the data parameters.

In one embodiment, for each of the service modules 214, the data distributor module 212 retrieves the values of the data parameters requested by the service module 214 and constructs a message for transmission to the service module 214 that includes the values. Alternatively, the data distributor module 212 may retrieve the values of data parameters requested by a plurality of the service modules 214 and construct a message for the plural service modules 214 that includes the values. For example, the data distributor module 212 may form the same, or a common, message for multiple service modules 214. The message may be in the form of a list, table, or other memory structure.

Table 2 provides an example of contents of a message that may be formed by the data distributor module 212. The actual format of the message may differ from Table 2, but the information in the message may correspond to the information below.

TABLE 2

| Data Parameter | Value |
|---|---|
| A | 12.34 |
| B | LOW |
| C | 0 |
| D | 41.90, −87.68 |

The contents of the message represented by Table 2 may correspond to the values of the requested data parameters in the request list 400 shown in FIG. 4. For example, the left column of Table 2 may include the data parameters that were requested by the first service module 214 and the right column of Table 2 may include the corresponding values of the data parameters, as obtained by the data acquisition modules 208 and retrieved from the shared memories 210 by the data distributor module 212. In one embodiment, the values of the data parameters to be included in a message are concatenated by the data distributor module 212. For example, with respect to the example of Table 2 above, the message may be formed as "12.34 LOW 0 41.90-87.68" or as a series of binary digits (e.g., 0 and 1). Alternatively, another protocol or format may be used.

The messages formed by the data distributor module 212 are transmitted 314 to the service modules 214. For example, the message or messages that include values of the data parameters requested by the first service module 214a can be transmitted from the data distributor module 212 to the first service module 214a, the message or messages that include values of the data parameters requested by the second service module 214b can be transmitted from the data distributor module 212 to the second service module 214b, and so on. The transmission of the messages to the service modules 214 may be referred to as publishing the data parameters to the service modules 214. The service modules 214 may receive published messages that include the values of the data parameters requested by the service modules 214.

The data distributor module 212 sends the messages that include the data parameters to the various service modules 214 at one or more publication rate. A "publication rate" means the rate or frequency at which one or more of the values of the requested data parameters are sent to one or more of the service modules 214. The service modules 214 may inform the data distributor module 212 of the publication rate that is requested by each of the service modules 214 in the request lists that are sent to the data distributor module 212. For example, in addition to providing the requested data parameters in the request list, one or more of the service modules 214 may include publication rates in the request lists that notify the data distributor module 212 of the rates at which the service modules 214 want the values of the requested data parameters transmitted from the data distributor module 212 to the service modules 214. The data distributor module 212 can instruct the data acquisition modules 208 to acquire and save the values of the data parameters based on the requested publication rates sent by the service modules 214. Alternatively, one or more of the data acquisition modules 208 may acquire and/or save the values of one or more data parameters at a fixed or predetermined rate.

The service modules 214 may request the data parameters from the data distributor module 212 at different rates. For example, a first service module 214a may request values of a data parameter at a rate of once every sixty seconds while a second service module 214b may request values of the data parameter at a rate of once every second. The data distributor module 212 can compare the various publication rates requested by two or more of the service modules 214 for the same data parameter to determine a rate at which the data distributor module 212 instructs the corresponding data acquisition module 208 to acquire and/or save values of the data parameter. For example, the data distributor module 212 may determine which of the service modules 214 has requested a faster publication rate. With respect to the above example, the data distributor module 212 can determine that the second service module 214b has a faster requested publication rate because the second service module 214b requests that the data parameter be published once every second while the first service module 214 only requests publication once every sixty seconds.

In one embodiment, based on this comparison, the data distributor module 212 can direct the corresponding data acquisition module 208 to acquire and/or save the values of the requested data parameter at a rate that is based on the faster of the requested publication rates. In continuing with the above example, the data distributor module 212 may direct the data acquisition module 212 to acquire and/or save the values of the data parameter at a rate that is as fast as, or no slower than, the faster of the requested publication rates submitted by two or more of the service modules 214. The data distributor module 212 may then publish the values of the data parameter from the shared memory 210 to the second service module 214b at a rate of at least once every second while the data distributor module 212 may only publish the values of the data parameter to the first service module 214a at a rate of at least once every sixty seconds.

In accordance with one embodiment, the values of the requested data parameters are periodically returned to the service modules 214. Alternatively, the values may be returned in a non-periodic manner. For example, a data acquisition module 208 may send a notification message to the data distributor module 212 when a value of a data parameter that is obtained from a controller device 206 associated with the data acquisition module 208 is available and/or is updated. The value of the data parameter may be available and/or updated in a non-periodic manner. For example, a data parameter that represents the setting or position of a switch may only be updated when the switch changes positions. When such a switch changes positions, the data acquisition module 208 may send an asynchronous notification message to the data distributor module 212 to notify the data distributor module 212 that the value of the corresponding data parameter is available and/or updated. The data acquisition module 208 stores the newly available and/or updated value of the data parameter in the shared memory 210, as described above. Upon receipt of the notification message, the data distributor module 208 may obtain the value of the data parameter from the shared memory 210 and include the value in a message that is sent to the service modules 214.

The management of the requests for data parameters and the publication of the data parameters through the centralized data distribution module 212 as described above can reduce the amount of computer processing resources and/or memory resources that are consumed. For example, the filtering of the requests for the data parameters and/or the transmission of locations where the values of the data parameters are stored instead of the actual values of the data parameters can reduce the processing and/or memory resources needed to request, retrieve, and/or publish the values of the data parameters.

In accordance with one embodiment, the system 200 can be a modular system for requesting and publishing values of data parameters to the service modules 214. The system 200 may be modular in that various components separately perform functions such that the system 200 may be scalable. For example, additional service modules 214 may be added to the system 200 and may request data parameters from the data distributor module 212, with each service module 214 forming a request list and the data distributor module 212 filtering the request lists according to the data acquisition modules 208, obtaining memory indices of the data parameters, retrieving the values of the data parameters, and publishing the values to the various service modules 214. Similarly, a larger number of controllers 206 (shown in FIG. 2), data acquisition modules 208, and/or shared memories 210 may be added to the system 200 and the data distributor module 212 may continue to receive and filter request lists, and obtain and transmit values of the data parameters, as described above. In one embodiment, the requests for the data parameters and the values of the data parameters pass through and are handled by the data distributor module 212. Additional data acquisition modules 208 and/or service modules 214 may be added to the system and the data distributor module 212 may continue to control the flow of the data parameters throughout the system 200 as described above.

FIG. 6 is a schematic diagram of one embodiment of the data distributor module 212. As described above, the data distributor module 212 may include a hardware and/or software system that operates to perform one or more functions. In the illustrated embodiment, the data distributor module 212 includes several submodules that perform various functions described herein. One or more of the submodules may include at least a portion of the hardware and/or software that forms the data distributor module 212. For example, each of the submodules may represent a single processor or multiple processors and/or a single software application or multiple applications that are part of the data distributor module 212. Alternatively, a plurality of all of the submodules may represent a single processor and/or a single software application that is part of the data distributor module 212.

A request list submodule 600 receives the request lists (e.g., the request lists 400, 402, 404, 406 shown in FIG. 4) from the service modules 214, as described above. The request list submodule 600 conveys the request lists to a filter submodule 602. The filter submodule 602 filters the requested data parameters included in the request lists according to which of the data acquisition modules 208 acquires values of the requested data parameters, as described above. The filter submodule 602 can form the filtered lists that each includes the requested data parameters associated with a different data acquisition module 208 among one or more of the request lists. The filter submodule 602 transmits the filtered lists to the data acquisition modules 208 in order for the data acquisition modules 208 to store the values of the requested data parameters in the shared memory 210, as described above.

A reader submodule 604 receives the response lists generated by the data acquisition modules 208. As described above, the response lists can include the memory indices that indicate where the values of the requested data parameters are stored in the shared memory 210. The reader submodule 604 uses the memory indices to retrieve (e.g., read) the values of the requested data parameters from the shared memory 210. The reader submodule 604 communicates the retrieved values of the data parameters to a publication submodule 606.

The publication submodule 606 forms one or more messages that include the values of the requested data parameters for the service modules 214. For example, the publication submodule 606 may create one or more data signals that include the values of the data parameters that are requested by one of the service modules 214 and communicate the one or more data signals for the service module 214. The publication submodule 606 may form a plurality of different messages for a plurality of different service modules 214 based on which data parameters are requested by which service modules 214.

Figure 7:
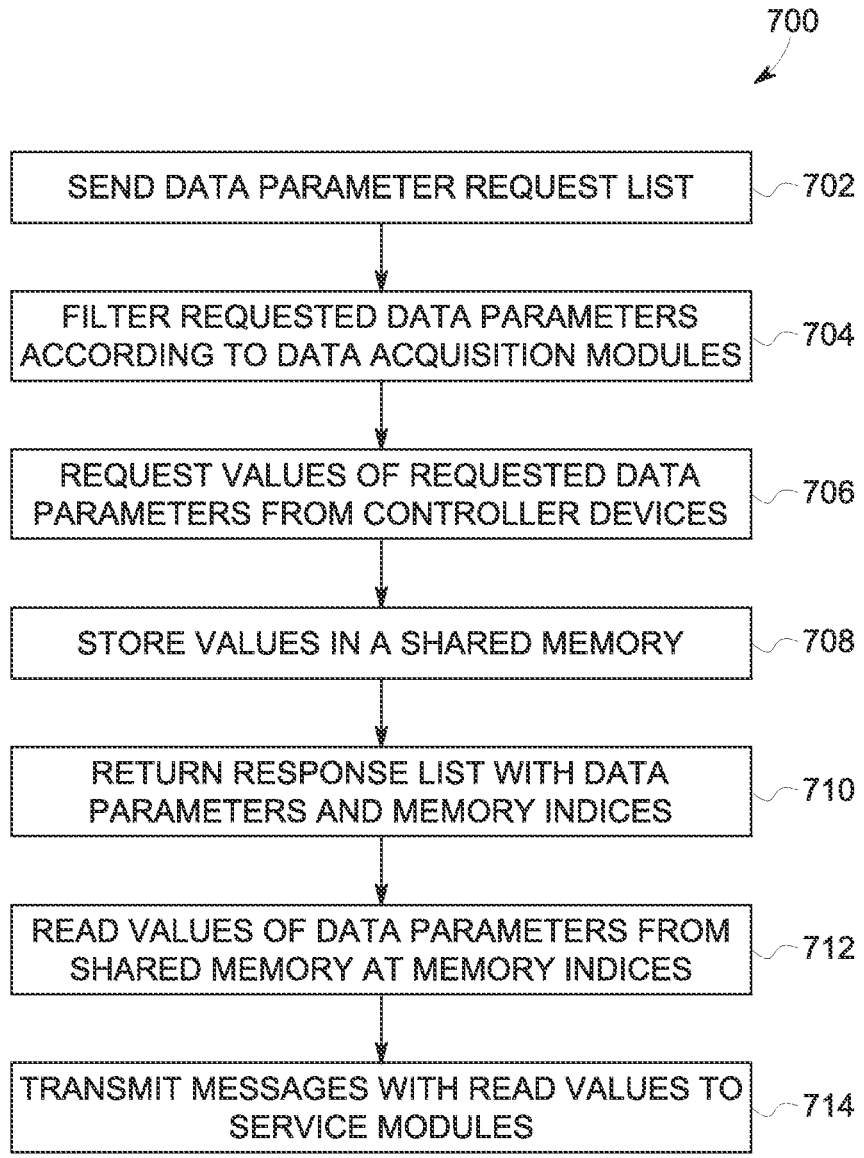
FIG. 7 is a flowchart of one embodiment of a method for distributing data in a vehicle.

FIG. 7 is a flowchart of one embodiment of a method 700 for distributing data in a vehicle. The method 700 may be used in conjunction with the system 200 (shown in FIG. 2) to communicate requests for values of data parameters from the service modules 214 (shown in FIG. 2) and the publishing of the values to the service modules 214 as described above.

At 702, one or more data parameter request lists are sent from service modules. For example, the service modules 214 (shown in FIG. 2) may transmit request lists 400, 402, 404, 406 (shown in FIG. 4) for the values of data parameters requested by the service modules 214 to perform one or more functions, as described above. The request lists may be sent to the data distributor module 212 (shown in FIG. 2).

At 704, the data parameters in the request lists are filtered according to which data acquisition modules acquire the data parameters. For example, the data distributor module 212 (shown in FIG. 2) may sort the requested data parameters by plural service modules 214 (shown in FIG. 2) according to which data acquisition modules 208 (shown in FIG. 2) obtain the values of the requested data parameters. The filtered sets of requested data parameters can be sent to the corresponding data acquisition modules 208, as described above.

At 706, the values of the requested data parameters are requested or obtained from controller devices. For example, a data acquisition module 208 (shown in FIG. 2) may obtain the values of the data parameters in a filtered list associated with the data acquisition module 208 and received from the data distributor module 212 (shown in FIG. 2). The data acquisition modules 208 may retrieve the values from the controller devices 206 (shown in FIG. 2), as described above.

At 708, the values of the data parameters that are obtained from the controller devices 206 are stored in one or more shared memories. For example, the data acquisition modules 208 (shown in FIG. 2) may store the values of the data parameters that are retrieved from the controller devices 206 (shown in FIG. 2) in one or more of the shared memories 210 (shown in FIG. 2). The values may be stored in a region or portion of the shared memories 210 and a memory index of where the values are stored may be generated, as described above.

At 710, one or more response lists that include the requested data parameters and the associated memory indices of where the values of the data parameters are stored are returned to the data distributor module. As described above, the response lists may indicate where the values of the requested data parameters are stored in the shared memories 210 (shown in FIG. 2).

At 712, values of the requested data parameters are read from the shared memory or memories at the associated memory indices. For example, the data distributor module 212 (shown in FIG. 2) may use the memory indices associated with the data parameters and included in the response lists received from the data acquisition modules 208 (shown in FIG. 2), as well as the list of requested data parameters in the request lists received from the service modules 214 (shown in FIG. 2), to obtain the values of the data parameters from the shared memories 210 (shown in FIG. 2).

At 714, the values of the requested data parameters are included in messages that are sent to the service modules that requested the values. For example, the data distributor module 212 (shown in FIG. 2) may form one or more messages (e.g., such as concatenated messages or other messages) for each service module 214 (shown in FIG. 2). The message for a service module 214 may include the values of the data parameters requested by the service module 214. The service module 214 receives the message and can use the values contained therein to perform one or more functions related to operation of the vehicle 202 (shown in FIG. 2).

In accordance with one embodiment, a data distribution system for a vehicle is provided. The distribution system includes a data distributor module. The data distributor module is configured to be communicatively coupled with a first data acquisition module that obtains values of one or more available data parameters related to operation of the vehicle, a first service module that provides one or more functions for the vehicle based on the values, and a memory. The data distributor module is further configured to receive a first request list from the first service module that includes one or more requested data parameters of the available data parameters. The data distributor module also is configured for the first data acquisition module to store the values of the requested data parameters in the memory. The data distributor module further is configured to retrieve the values of one or more of the requested data parameters from the memory and communicate the values that are retrieved to the first service module for the first service module to use the values that are retrieved to provide the one or more functions for the vehicle.

In another aspect, the service module is configured to use at least one of the values communicated from the data distributor module to control at least one of tractive effort or braking effort provided by the vehicle.

In another aspect, the data distributor module is configured to receive a memory index from the first data acquisition module. The memory index indicates where the values of one or more of the requested data parameters are stored in the memory. The data distributor module is configured to retrieve the values from the memory according to the memory index.

In another aspect, the data distributor module is configured to receive at least a second request list from at least a second service module. The first request list and the second request list include the requested data parameters provided by the first data acquisition module and at least a different, second data acquisition module. The data distributor module is further configured to filter the requested data parameters in the first request list and the second request list according to which of the first data acquisition module and the second data acquisition module provide the values of the requested data parameters.

In another aspect, the data distributor module is configured to send at least one third list of the requested data parameters that are filtered to the first data acquisition module and to the second data acquisition module based on which of the first data acquisition module and the second data acquisition module obtains the values of the requested data parameters.

In another aspect, the data distributor module is configured to receive a response list from the first data acquisition module that indicates where the values of the requested data parameters are stored in the memory. The data distributor module is further configured to retrieve the values of the requested data parameters based on the response list.

In another aspect, the data distributor module is configured to periodically retrieve the values of the requested data parameters from the memory and send the values that are retrieved to the first service module.

In another aspect, the data distributor module is configured to receive an asynchronous notification from the first data acquisition module when the value of one or more of the requested data parameters is at least one of available or updated. The data distributor module is further configured to, in response to the asynchronous notification, retrieve, from the memory, the value that is at least one of available or updated and send the value to the first service module.

In another embodiment, a data distribution system for a vehicle is provided that includes a data distributor module and a shared memory. The data distributor module is communicatively coupled with the shared memory and is configured to receive requests for data parameters from a plurality of service modules, filter the requests for the data parameters, and communicate the filtered requests for the data parameters to a plurality of data acquisition modules that generate the data parameters and store the data parameters in the shared memory. The data parameters relate to operations of the vehicle. The data distributor module also is configured to at least one of: retrieve the data parameters from the shared memory, based on memory indices of the stored data parameters received from the data acquisition modules, and communicate the data parameters that are retrieved from the shared memory to the plurality of service modules for use by the plurality of service modules in performing one or more functions for the vehicle; or communicate the memory indices to the plurality of service modules for the service modules to retrieve the stored data parameters from the shared memory.

In another aspect, the data distributor module is configured to communicate the data parameters or the memory indices to the plurality of service modules at one or more rates as requested by the service modules.

In another embodiment, a method for distributing data in a vehicle is provided. The method includes receiving a first request list for values of one or more requested data parameters. The values represent operations of the vehicle and used to perform one or more functions for the vehicle. The method also includes determining which of one or more data acquisition modules acquires the values of the one or more requested data parameters and storing the values in a memory. The method further includes retrieving the values from the memory in order to transmit the values to one or more service modules that use the values to perform the functions for the vehicle.

In another aspect, the method also includes controlling at least one of tractive efforts or braking efforts of the vehicle based on the values that are retrieved from the memory.

In another aspect, the method also includes receiving one or more memory indices from the one or more data acquisition modules. The memory indices indicate where the values of one or more of the requested data parameters are stored in the memory. The retrieving step can include reading the values from the memory according to the memory index.

In another aspect, the receiving step includes receiving at least a second request list including one or more of the requested data parameters. The first request list and the second request list can include the requested data parameters provided by different ones of the one or more data acquisition modules. The method may further comprise filtering the requested data parameters in the first request list and the second request list according to which of the data acquisition modules provide the values of the requested data parameters.

In another aspect, the method also includes sending the requested data parameters that are filtered to each of the data acquisition modules based on which of the data acquisition modules obtains the values of the requested data parameters.

In another aspect, the method also includes receiving a response list from one or more of the data acquisition modules that indicates where the values of the requested data parameters are stored in the memory. The retrieving step can include reading the values of the requested data parameters based on the response list.

In another aspect, the retrieving step includes periodically retrieving the values of the requested data parameters and sending the values that are retrieved to the one or more service modules.

In another aspect, the method also includes receiving an asynchronous notification from one or more of the data acquisition modules when the value of one or more of the requested data parameters is at least one of available or updated. The method may further include retrieving the value that is at least one of available or updated in order to transmit the value that is at least one of available or updated to the first service module in response to the asynchronous notification.

In another embodiment, another method for distributing data in a vehicle is provided. The method includes receiving requests for data parameters from a plurality of service modules. The data parameters relate to operations of the vehicle. The method also includes filtering the requests for the data parameters and communicating the requests that are filtered for the data parameters to a plurality of data acquisition modules that generate the data parameters and store the data parameters in a shared memory with memory indices representative of where the data parameters are stored. The method also includes at least one of: retrieving the data parameters from the shared memory, based on memory indices of the data parameters that are stored in the shared memory and received from the data acquisition modules, and communicating the data parameters that are retrieved from the shared memory to the plurality of service modules for use by the plurality of service modules in performing one or more functions for the vehicle; or communicating the memory indices to the plurality of service modules for the service modules to retrieve the stored data parameters from the shared memory based on the memory indices.

In another embodiment, another data distribution system for a vehicle is provided. The distribution system includes a request list submodule, a filter submodule, a reader submodule, and a publication submodule. The request list submodule is configured to receive requests for values of one or more available data parameters from plural service modules of the vehicle. The data parameters represent operations of the vehicle. The filter submodule is configured to filter the requests based on which of plural data acquisition modules of the vehicle acquire the values of the data parameters in the requests. One or more of the data acquisition modules store the values in a shared memory. The reader submodule is configured to retrieve the values of the data parameters in the requests from the shared memory. The publication submodule is configured to form one or more messages for transmission to the service modules. The one or more messages include the values of the data parameters that are requested by the service modules.

In another aspect, at least one of the service modules is configured to use one or more of the values communicated from the publication submodule to the at least one of the service modules to control at least one of tractive effort or braking effort provided by the vehicle.

In another aspect, the reader submodule is configured to receive one or more memory indices from the one or more data acquisition modules. The memory indices can indicate where the values of the data parameters are stored in the memory by the one or more data acquisition modules.

In another aspect, the filter submodule is configured to send the data parameters of the requests that are filtered to each of the plural data acquisition modules based on which of the data acquisition modules obtains the values of the data parameters of the requests.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable a person of ordinary skill in the art to practice the embodiments of inventive subject matter, including making and using any devices or systems and performing any incorporated methods. The patentable scope of the inventive subject matter is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described distribution systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A data distribution system for a vehicle, the distribution system comprising:
    a data distributor module including one or more processors, the data distributor module configured to be communicatively coupled with a first service module that includes one or more processors and provides one or more functions for the vehicle based on values of data parameters, the data distributor module configured to receive a first request list from the first service module that includes one or more requested data parameters, and
    a plurality of data acquisition modules including one or more processors, the data acquisition modules communicatively coupled with the data distributor module, each of the data acquisition modules configured to obtain the values of different data parameters,
    wherein the data distributor module is configured to determine which of the data acquisition modules obtain each of the requested data parameters and to send a filtered list to each data acquisition module that obtains at least one of the requested data parameters, the filtered list including the one or more data parameters that are obtained by the receiving data acquisition module,
    wherein, in response to receiving the filtered list, each receiving data acquisition module is configured to obtain the values of the one or more requested data parameters included in the received filtered list and store the values in one or more shared memories, the data acquisition modules further configured to transmit one or more response lists to the data distributor module that indicate locations in the one or more shared memories where the values of the one or more requested parameters are stored,
    wherein, in response to receiving the one or more response lists, the data distributor module is configured to retrieve the values of the one or more requested data parameters from the one or more shared memories based on the one or more response lists and transmit a message to the first service module that includes the values of the one or more data parameters requested by the first service module for the first service module to use the values to provide the one or more functions for the vehicle.

2. The data distribution system of claim 1, wherein the first service module is configured to use at least one of the values communicated from the data distributor module to control at least one of tractive effort or braking effort provided by the vehicle.

3. The data distribution system of claim 1, wherein the one or more response lists include a memory index and
    the data distributor module is configured to retrieve the values from the one or more shared memories according to the memory index.

4. The data distribution system of claim 1, wherein the data distributor module is configured to receive at least a second request list from at least a second service module, the first request list and the second request list including requested data parameters that are obtained by a first data acquisition module and at least a different, second data acquisition module of the plurality of data acquisition modules; and wherein the data distributor module is configured to filter the requested data parameters in the first request list and the second request list according to which of the first data acquisition module or the second data acquisition module obtains the values of each of the requested data parameters.

5. The data distribution system of claim 4, wherein the data distributor module is configured to send the filtered list as a first filtered list to the first data acquisition module and the data distributor module is configured to send a different, second filtered list to the second data acquisition module, the first filtered list including the requested data parameters that are obtained by the first data acquisition module and the second filtered list including the requested data parameters that are obtained by the second data acquisition module.

6. The data distribution system of claim 1, wherein the data distributor module is configured to periodically retrieve the values of the requested data parameters from the one or more shared memories and send the values that are retrieved to the first service module.

7. The data distribution system of claim 1, wherein the data distributor module is configured to receive an asynchronous notification from one or more of the data acquisition modules when the value of one or more of the requested data parameters is at least one of available or updated; and
the data distributor module is configured to, in response to the asynchronous notification, retrieve from the one or more shared memories the value that is at least one of available or updated and send the value to the first service module.

8. A data distribution system for a vehicle, the distribution system comprising:
a data distributor module including one or more processors and a shared memory having a tangible and non-transitory computer readable storage medium, the data distributor module communicatively coupled with the shared memory;
wherein the data distributor module is configured to receive requests for data parameters from a plurality of service modules that each includes one or more processors, the data parameters relation to operations of the vehicle and the service modules configured to perform one or more functions for the vehicle based on values of the data parameters, the data distributor module configured to filter the requests for the data parameters, and communicate the filtered requests for the data parameters to a plurality of data acquisition modules that each includes one or more processors, the data distributor module filtering the requests for the data parameters and communicating the filtered requests based on which of the data acquisition modules obtain each of the data parameters, each data acquisition module that receives a filtered request configured to obtain the values of the data parameters according to the corresponding filtered request and store the values of the data parameters in the shared memory;
wherein the data distributor module is further configured to at least one of:
retrieve the values of the data parameters from the shared memory based on memory indices of the stored data parameters received from one or more of the data acquisition modules after the one or more data acquisition modules store the values of the data parameters in the shared memory, the memory indices indicating locations in the shared memory where the values of the data parameters are stored, and the data distributor module configured to communicate the values of the data parameters that are retrieved from the shared memory to the plurality of service modules for use by the plurality of service modules in providing the one or more functions for the vehicle: or
communicate the memory indices that are received from the one or more data acquisition modules to the plurality of service modules for the service modules to retrieve the values of the stored data parameters from the shared memory based on the memory indices for use by the plurality of service modules in performing the on more functions for the vehicle.

9. The system of claim 8. wherein the data distributor module is configured to communicate at least one of the values of the data parameters or the memory indices to the plurality of service modules at one or more rates as requested by the service modules.

10. A method for distributing data in a vehicle, the method comprising:
receiving a first request list for values of one or more requested data parameters, the requested data parameters related to operations of the vehicle and used to perform one or more functions for the vehicle;
determining which of one or more data acquisition modules that each includes one or more processors acquires the values of each of the one or more requested data parameters and forming one or more filtered lists that associates each of the one or more requested data parameters with the data acquisition module that acquires the values of the respective data parameter;
sending the one or more filtered lists to the one or more data acquisition modules for the one or more data acquisition modules that receive the one or more filtered lists to acquire the values of the data parameters in the received filtered list and store the values in a memory having a tangible and non-transitory computer readable storage medium; and
in response to receiving one or more response lists from the one or more data acquisition modules that indicate locations in the memory where the values of the one or more requested data parameters are stored, retrieving the values from the locations in the memory based on the one or more response lists in order to transmit the values to one or more service modules that each includes one or more processors, the one or more service modules configured to use the values to perform the one or more functions for the vehicle.

11. The method of claim 10, further comprising controlling at least one of tractive efforts or braking efforts of the vehicle based on the values that are retrieved from the memory.

12. The method of claim 10, wherein the one or more response lists from the one or more data acquisition modules include memory indices and the retrieving step includes reading the values from the memory according to the memory indices.

13. The method of claim 10, wherein the one or more data acquisition modules include at least two data acquisition modules, the receiving step includes receiving at least a second request list including one or more of the requested data parameters, the first request list and the second request list including the requested data parameters provided by different ones of the at least two data acquisition modules, further comprising filtering the requested data parameters in the first request list and the second request list according to which of the different ones of the at least two data acquisition modules provide the values of the requested data parameters.

14. The method of claim 13, wherein the sending step includes sending the requested data parameters that are filtered to one or more of the different ones of the data acquisition modules based on which of the data acquisition modules acquires the values of the requested data parameters.

15. The method of claim 10, wherein the retrieving step includes periodically retrieving the values of the requested data parameters and sending the values that are retrieved to the one or more service modules.

16. The method of claim 10, further comprising receiving an asynchronous notification from one or more of the data acquisition modules when the value of one or more of the requested data parameters is at least one of available or updated; and
retrieving the value that is at least one of available or updated in order to transmit the value that is at least one of available or updated to the one or more service modules in response to the asynchronous notification.

17. A method for distributing data in a vehicle, the method comprising:
receiving requests for data parameters from a plurality of service modules that each includes one or more processors, the data parameters relating to operations of the vehicle and the service modules configured to perform one or more functions for the vehicle based on values of the data parameters;
filtering the requests for the data parameters based on which of a plurality of data acquisition modules obtain each of the data parameters that are in the requests, the data acquisition modules each including one or more processors;
communicating the requests that are filtered as filtered lists to one or more of the data acquisition modules, the one or more data acquisition modules that receive one of the filtered lists obtain the values of the data parameters in the respective filtered list responsive to receiving the filtered list and store the values of the data parameters in a shared memory with memory indices representative of where the values are stored; and
in response to receiving the memory indices from the one or more data acquisition modules, at least one of:
retrieving the values of the data parameters from the shared memory based on the memory indices, and communicating the values of the data parameters that are retrieved from the shared memory to the plurality of service modules for use by the plurality of service modules in performing the one or more functions for the vehicle; or
communicating the memory indices to the plurality of service modules for the service modules to retrieve the values of the stored data parameters from the shared memory based on the memory indices.

18. A data distribution system for a vehicle, the distribution system comprising:
a request list submodule configured to receive requests for values of one or more available data parameters from plural service modules of the vehicle, the data parameters relating to operations of the vehicle, the service modules each include one or more processors and are configured to provide one or more functions for the vehicle based on values of the data parameters;
a filter submodule configured to filter the requests based on which of plural data acquisition modules of the vehicle acquire the values of each of the data parameters in the requests, form filtered lists that each include the requested data parameters that are acquired by a different one of the data acquisition modules, and transmit the filtered lists to the corresponding data acquisition modules for each of the data acquisition modules that receives one of the filtered lists to acquire the values of the data parameters on the respective received filtered list and store the acquired values in a shared memory having a tangible and non-transitory computer readable storage medium, the plural service modules and the plural data acquisition modules each including one or more processors;
a reader submodule configured to retrieve the values of the data parameters in the requests from the shared memory based on one or more response lists that are received by the reader submodule from the data acquisition modules that store the values of the data parameters in the shared memory, the one or more response lists indicating locations in the shared memory where the values of the data parameters are stored; and
a publication submodule configured to form one or more messages for transmission to the service modules, wherein the one or more messages include the values of the data parameters that are requested by the service modules, wherein the request list submodule, the filter submodule, the reader submodule, and the publication submodule at least one of each include one or more processors or are commonly grouped within one or more processors.

19. The data distribution system of claim 18, wherein at least one of the service modules is configured to use one or more of the values communicated from the publication submodule to the at least one of the service modules to control at least one of tractive effort or braking effort provided by the vehicle.

20. The data distribution system of claim 18, wherein the one or more response lists include one or more memory indices that indicate where the values of the data parameters are stored in the shared memory by the one or more data acquisition modules.

21. The data distribution system of claim 18, wherein the filter submodule is configured to transmit the filtered lists to one or more of the plural data acquisition modules based on which of the data acquisition modules obtains the values of the data parameters in each of the filtered lists.

* * * * *